Patented July 31, 1934

1,968,544

UNITED STATES PATENT OFFICE 1,968,544

PHOSPHORIC ACID PURIFICATION BY SOLVENT EXTRACTION

Charles A. Vana, Cleveland, Ohio, assignor to The Grasselli Chemical Company, Cleveland, Ohio, a corporation of Delaware No Drawing. Application November 23, 1933, Serial No. 699,407

13 Claims. (Cl. 23—165)

The present invention relates to processes of recovering purified phosphoric acid from aqueous solutions of technical phosphoric acid.

I have found that phosphoric acid is soluble in oxygenated cycloparaffins. Due to the insolubility of oxygenated cycloparaffins in water, they are particularly well adapted for use in the extraction of pure phosphoric acids from impure technical phosphoric acid solutions.

In general, my process comprises contacting a solution of phosphoric acid with a liquid oxygenated cycloparaffin so that the phosphoric acid dissolves in the oxygenated cycloparaffin. The oxygenated cycloparaffin-phosphoric acid layer is then separated from the aqueous layer and the purified phosphoric acid removed, if desired, from the oxygenated cycloparaffin.

Among the oxygenated cycloparaffins I may mention for purposes of illustration cyclohexanone, methyl cyclohexanone, cyclohexanol, and methyl cyclohexanol. In connection with the methyl cyclohexanone and methyl cyclohexanol, it is noted that they may be, for example, 2-methyl, 3-methyl, 2-5-5-trimethyl, etc. cyclohexanol or cyclohexanone, or commercial mixtures of such compounds. These illustrative oxygenated cycloparaffins are all relatively water insoluble and will dissolve phosphoric acid. While the oxygenated cycloparaffins are somewhat water soluble, they operate very well. The cycloparaffins which are dissolved in the water in the course of my process may be later recovered in any suitable manner, as by distillation. Instead of extracting the impure phosphoric acid from aqueous solutions, I may extract phosphoric acid from its associated impurities with my solvents without putting the acid in water solution.

In following out one embodiment of my invention, I added an oxygenated cycloparaffin to a technical phosphoric acid solution and agitated for about an hour. At the end of this time I allowed the water and cycloparaffin layers to separate. I then drew off each layer. To the phosphoric acid-solvent layer, fresh water was added, and the phosphoric acid was then transferred to the water by stirring. The phosphoric acid-water and the solvent layers were then allowed to separate. I then drew off the phosphoric acid-water layer and returned the solvent to the once extracted technical phosphoric acid solution. I repeated this cycle of extraction until only about 12% of the original phosphoric acid remained in the residual technical phosphoric acid solution.

While methyl cyclohexanol and methyl cyclohexanone gave good results, I have found cyclohexanol and cyclohexanone better. I may, of course, use commercial mixtures of cycloparaffins, as it is not necessary that pure individual oxygenated cycloparaffin be used. I may also use mixtures of oxygenated cycloparaffins with other water immiscible liquids. The added liquids may, for example, be water insoluble solvents which are less capable of dissolving phosphoric acid than are the oxygenated cycloparaffins. Such hydrocarbon liquids as benzol, for example, might be used. If benzol were mixed with oxygenated cycloparaffins, the solvent as a whole would be less efficient in extracting phosphoric acid, but the acid would be somewhat purer.

In addition to the oxygenated cycloparaffins I have found that such solvents as triacetin, glycerol, dichlorhydrin, benzaldehyde, and ethyl acetate may be used to extract phosphoric acid from aqueous solution, but the tendency for phosphoric acid to leave water and go into these compounds is so slight as to make them almost impractical for commercial use.

Instead of repeatedly extracting the technical phosphoric acid with fresh solvent, I may operate my process in a countercurrent manner. That is, the process will be conducted so that the fresh solvent first contacts the nearly exhausted phosphoric acid solution and continues contacting successively stronger phosphoric acid solution.

The oxygenated cycloparaffin-phosphoric acid solution may, after separation from the aqueous phosphoric acid solution, be used directly in the trade wherever an oxygenated cycloparaffin-phosphoric acid solution is desirable, as in rust removing compositions and rustproofing paints.

The phosphoric acid may be removed from the solvent-phosphoric acid solution by, for example, countercurrent extraction with water.

I may separate the oxygenated cycloparaffin solvent and phosphoric acid by distillation. Or I may first convert the phosphoric acid into salts of sodium, ammonium or alkaline earths by adding to the oxygenated cycloparaffin solution of phosphoric acid the desired base as, for example, sodium or ammonium hydroxide, sodium or ammonium carbonate, calcium hydroxide, etc. The salts may then be separated from the oxygenated cycloparaffin by extraction with water, by crystallization, or by any other desired means.

Whatever the method of removal, the oxygenated cycloparaffins may be reused to extract more phosphoric acid, thus rendering the process cyclical.

I claim:

1. In a process of purifying phosphoric acid, the steps comprising: contacting impure phosphoric acid with an oxygenated cycloparaffin and recovering the resulting oxygenated cycloparaffin-phosphoric acid solution.

2. A process of treating phosphoric acid which comprises contacting an impure aqueous phosphoric acid solution with an oxygenated cycloparaffin, separating the resulting oxygenated cycloparaffin-phosphoric acid solution from the aqueous solution, and separating the oxygenated cycloparaffin from the product dissolved therein.

3. In a process of purifying phosphoric acid, the steps comprising: extracting phosphoric acid from an impure aqueous solution with an oxygenated cycloparaffin, separating the resultant oxygenated cycloparaffin-phosphoric acid solution from the aqueous layer, extracting the phosphoric acid from the oxygenated cycloparaffin-phosphoric acid solution with water, and separating the aqueous solution of purified phosphoric acid from the oxygenated cycloparaffin layer.

4. In a process of purfying phosphoric acid, the steps comprising: running impure phosphoric acid in countercurrent with an oxygenated cycloparaffin and recovering the resulting oxygenated cycloparaffin-phosphoric acid solution.

5. A process of treating phosphoric acid which comprises running an impure aqueous phosphoric acid solution in counter-current with an oxygenated cycloparaffin, separating the resulting oxygenated cycloparaffin-phosphoric acid layer from the aqueous layer, and separating the oxygenated cycloparaffin from the product dissolved therein.

6. In a process of purifying phosphoric acid, the steps comprising: running an impure aqueous phosphoric acid solution in countercurrent with an oxygenated cycloparaffin, separating the resulting oxygenated cycloparaffin-phosphoric acid solution layer from the aqueous layer, extracting the phosphoric acid from the oxygenated cycloparaffin-phosphoric acid solution with water and separating the aqueous solution of purified phosphoric acid from the oxygenated cycloparaffin layer.

7. In a process of purifying phosphoric acid, the steps comprising: running an impure aqueous phosphoric acid solution in countercurrent with an oxygenated cycloparaffin, separating the resulting oxygenated cycloparaffin-phosphoric acid solution layer from the aqueous layer, running the oxygenated cycloparaffin-phosphoric acid solution in countercurrent with fresh water, and separating the aqueous solution of purified phosphoric acid from the oxygenated cycloparaffin layer.

8. In a process of purifying phosphoric acid, the steps comprising: contacting impure phosphoric acid with cyclohexanone and recovering the resulting cyclohexanone-phosphoric acid solution.

9. A process of treating phosphoric acid which comprises contacting an impure aqueous phosphoric acid solution with cyclohexanone, separating the resultant cyclohexanone-phosphoric acid solution layer from the aqueous layer, and separating the cyclohexanone from the product dissolved therein.

10. In a process of purifying phosphoric acid, the steps comprising: extracting phosphoric acid from a technical phosphoric acid solution with cyclohexanone, separating the resulting cyclohexanone-phosphoric acid solution layer from the aqueous layer, extracting the phosphoric acid from the cyclohexanone-phosphoric acid solution with fresh water, and separating the aqueous solution of purified phosphoric acid from the cyclohexanone solution.

11. In a process of purifying phosphoric acid, the steps comprising: contacting impure phosphoric acid with cyclohexanol and recovering the resulting cyclohexanol-phosphoric acid solution.

12. A process of treating phosphoric acid which comprises contacting an impure aqueous phosphoric acid solution with cyclohexanol, separating the resultant cyclohexanol-phosphoric acid solution layer from the aqueous layer, and separating the cyclohexanol from the product dissolved therein.

13. In a process of purifying phosphoric acid, the steps comprising: extracting phosphoric acid from a technical phosphoric acid solution with cyclohexanol, separating the resulting cyclohexanol-phosphoric acid solution layer from the aqueous layer, extracting the phosphoric acid from the cyclohexanol-phosphoric acid solution with fresh water, and separating the aqueous solution of purified phosphoric acid from the cyclohexanol solution.

CHARLES A. VANA.